(12) United States Patent
Lesea

(10) Patent No.: US 7,739,565 B1
(45) Date of Patent: Jun. 15, 2010

(54) DETECTING CORRUPTION OF CONFIGURATION DATA OF A PROGRAMMABLE LOGIC DEVICE

(75) Inventor: Austin H. Lesea, Los Gatos, CA (US)

(73) Assignee: XILINX, Inc., San Jose, CA (US)

( * ) Notice: Subject to any disclaimer, the term of this patent is extended or adjusted under 35 U.S.C. 154(b) by 431 days.

(21) Appl. No.: 11/880,362

(22) Filed: Jul. 19, 2007

(51) Int. Cl.
G01R 31/28 (2006.01)
H03K 17/693 (2006.01)

(52) U.S. Cl. .......................................... 714/725; 716/16
(58) Field of Classification Search ........................ None
See application file for complete search history.

(56) References Cited

U.S. PATENT DOCUMENTS

| 6,492,833 B1 * | 12/2002 | Asson et al. ................... 326/41 |
| 6,651,238 B1 * | 11/2003 | Wells et al. .................... 716/16 |
| 7,036,059 B1 * | 4/2006 | Carmichael et al. .......... 714/725 |
| 7,257,750 B1 * | 8/2007 | Singh et al. ................. 714/732 |
| 7,356,756 B1 * | 4/2008 | Chan et al. ................... 714/781 |
| 7,401,280 B1 * | 7/2008 | Singh et al. ................. 714/732 |
| 7,596,744 B1 * | 9/2009 | Kow et al. ................... 714/819 |

2005/0071730 A1 * 3/2005 Moyer et al. ................. 714/758

OTHER PUBLICATIONS

Chowdhury, Debopriyo et al., "Design of Robust CMOS Circuits for Soft Error Tolerance," class presentation for course EE241, May 9, 2006, pp. 1-6, Univ. of California at Berkeley, Berkeley, California, USA.
Ejlali, Alireza, "Energy Efficient SEU-Tolerance in DVS-Enabled Real-Time Systems through Information Redundancy," *Proc. of the 2005 International Symposium on Low Power Electronics & Design*, Aug. 8, 2005, pp. 281-286, ACM, Inc., New York, New York, USA.

* cited by examiner

*Primary Examiner*—Kevin L Ellis
*Assistant Examiner*—Guerrier Merant
(74) *Attorney, Agent, or Firm*—LeRoy D. Maunu

(57) ABSTRACT

A programmable logic device includes a configuration memory, a checker, and a redundant-logic detector. An array of programmable logic and interconnect resources is configurable to implement a selected user design. The configuration memory stores configuration data that configures the array of programmable logic and interconnect resources to implement the specified user design. A checker calculates a sequence of checksums from the configuration data that is stored in the configuration memory. A redundant-logic detector indicates corruption of the configuration data stored in the configuration memory in response to at least two consecutive checksums in the sequence not matching a reference value.

19 Claims, 6 Drawing Sheets

DETECTING CORRUPTION OF CONFIGURATION DATA OF A PROGRAMMABLE LOGIC DEVICE

FIELD OF THE INVENTION

The present invention generally relates to programmable logic devices, and more particularly to protecting configuration data for programmable logic devices.

BACKGROUND

A programmable logic device (PLD) may implement a user design by programming a configuration memory of the PLD with configuration data that is generated from a specification of a user design. If the configuration data in the configuration memory is unintentionally modified, then the PLD may no longer implement the user design. For example, cosmic radiation may inject a stream of charged particles into the PLD and an electrical node in the PLD may collect enough charge from the stream of charged particles to cause a temporary change in the value of the electrical node. If the electrical node is on a feedback loop, such as a storage node of a SRAM memory cell, the temporary change in the value of the electrical node may cause corruption of data, such as changing the value stored in the SRAM memory cell. Thus, cosmic radiation may corrupt the configuration data stored in the configuration memory of a PLD and consequently corrupt the user design that is implemented in the PLD by the configuration data.

A checker can monitor the configuration data in the configuration memory of the PLD and issue an error upon detection of the corruption of the configuration data. However, cosmic radiation and noise sources may affect the checker such that an error is issued even though the configuration data is not corrupted. For example, a signal for reading configuration data from the configuration memory may be changed by charge injected into the signal from cosmic radiation, such that the checker falsely indicates corruption of the configuration data. Addressing false indications of corruption of the configuration data may be time consuming and expensive.

The present invention may address one or more of the above issues.

SUMMARY OF THE INVENTION

Various embodiments of the invention provide a programmable logic device that includes a configuration memory, a checker, and a redundant-logic detector. An array of programmable logic and interconnect resources is configurable to implement a selected user design. The configuration memory stores configuration data that configures the array of programmable logic and interconnect resources to implement the specified user design. A checker calculates a sequence of checksums from the configuration data that is stored in the configuration memory. A redundant-logic detector indicates corruption of the configuration data stored in the configuration memory in response to at least two consecutive checksums in the sequence not matching a reference value.

Various other embodiments of the invention provide a method for detecting corruption of configuration data of a programmable logic device. A respective limit register is initialized to a limit value for each of three sets. A sequence of checksums is serially calculated for the configuration data that is stored in the configuration memory of the programmable logic device. A value of a respective counter for each set is cleared when a checksum in the sequence matches a reference value. A value of the respective counter for each set is incremented when a checksum in the sequence does not match a reference value. Corruption of the configuration data is detected when two or more of the sets have a value of the respective counter that is not less than a value of the respective limit register.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
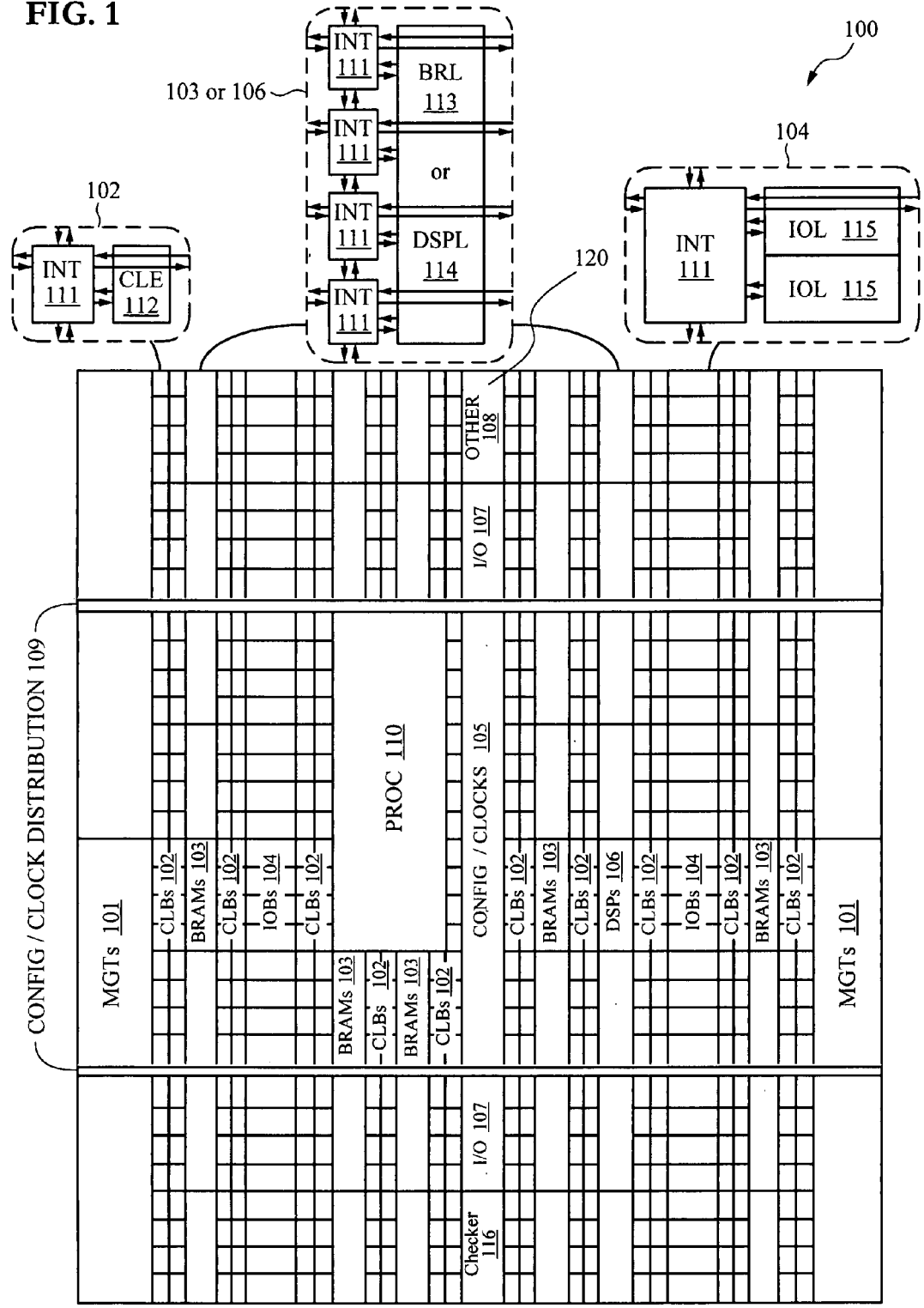
FIG. 1 is a block diagram of a programmable logic device in accordance with various embodiments of the invention.

FIG. 1 is a block diagram of a programmable logic device in accordance with various embodiments of the invention. FIG. 1 illustrates an advanced field programmable gate array (FPGA) architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110). In one embodiment, the FPGA architecture 100 may include a checker 116 for checking for corruption of a configuration memory. Values of configuration data stored in the configuration memory may control the functions implemented by the programmable tiles.

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). Certain values stored in configuration memory may control the logic function implemented by the CLE 122 and the programmable interconnections made by the programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (120 in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

Figure 2:
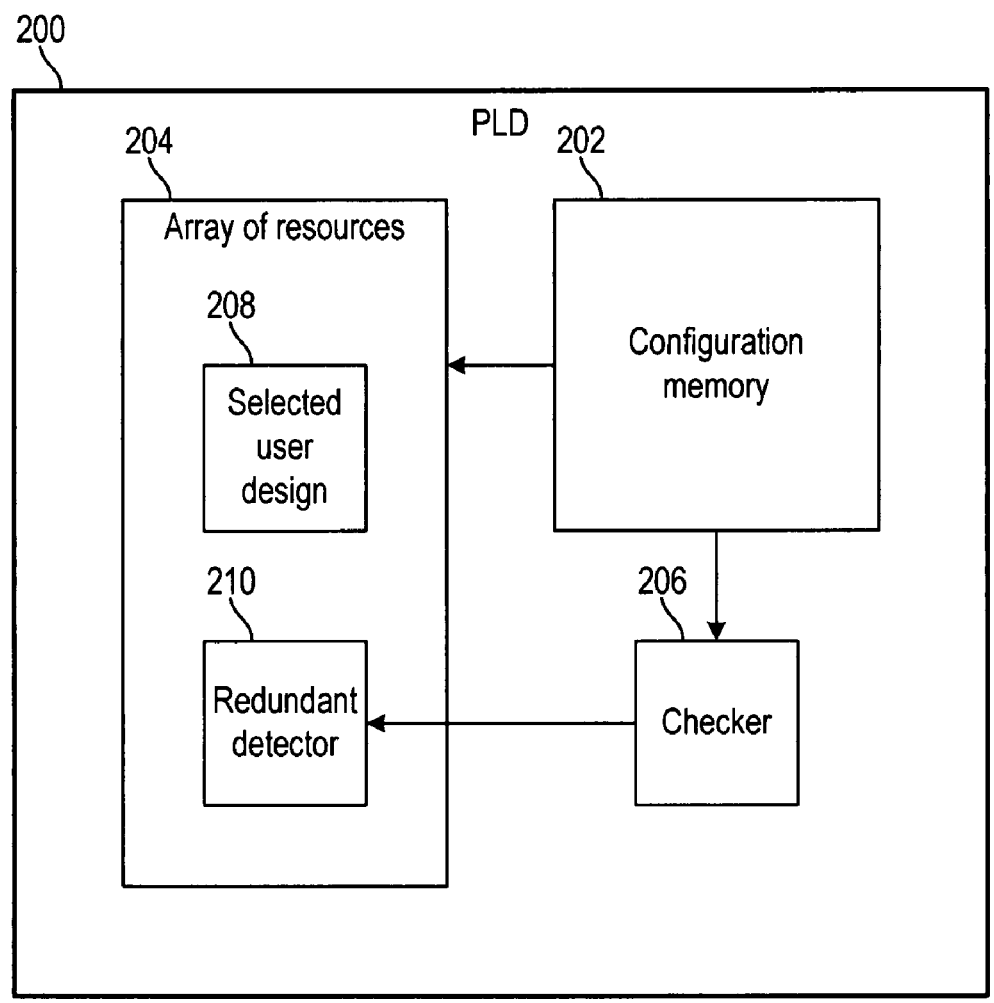
FIG. 2 is a block diagram of a programmable logic device that detects corruption of configuration data in accordance with various embodiments of the invention.

FIG. 2 is a block diagram of a programmable logic device (PLD) 200 that detects corruption of configuration data in accordance with various embodiments of the invention. The configuration data may be stored in configuration memory 202 to configure an array 204 of programmable logic and interconnect resources. Cosmic radiation and byproducts of radioactive decay may corrupt the configuration data stored in the configuration memory 202. Various embodiments of the invention robustly detect corruption of the configuration data.

A checker 206 periodically or continuously calculates a checksum of the configuration data that is stored in configuration memory 202. The checker 206 may compare each calculated checksum with an expected value to determine whether to indicate corruption of the configuration data in configuration memory 202. The checker 206 may be dedicated logic of the PLD 202 as shown. In another embodiment, a checker may be implemented in the array 204 of programmable logic and interconnect resources.

If the configuration data in configuration memory 202 becomes corrupted, the function of the selected user design 208 may be altered, and the user design 208 may no longer operate properly. Checker 206 may help provide a warning that the configuration memory 202 is corrupted. However, cosmic radiation and noise sources may affect checker 206 or the reading of configuration data from configuration memory 202 by checker 206. Thus, checker 206 may falsely indicate corruption of configuration memory 202 when the configuration data is not actually corrupted.

Redundant detector 210 may prevent false indications of corruption of the configuration memory 202. Redundant detector 210 may postpone indicating corruption of the configuration memory 202 until checker 206 indicates corruption for two or more successive checksums. A transient corruption may corrupt data within checker 206 or may corrupt data while the data is being read from configuration memory 202. A transient corruption may cause checker 206 to indicate corruption for a single checksum. Thus, redundant detector 210 does not indicate corruption of the configuration data in configuration memory 202 for a transient corruption. If the configuration data in configuration memory 202 does become corrupted, the corruption is generally a persistent corruption that affects every subsequently calculated checksum. Thus, redundant detector 210 does indicate corruption of the configuration data in configuration memory 202 for a persistent corruption.

Cosmic radiation or noise sources may also affect redundant detector 210. Thus, redundant detector 210 may include redundancy to avoid indicating corruption following a corruption affecting circuitry within redundant detector 210. The redundancy may be, for example, triply redundant logic and a majority voter circuit.

Figure 3:
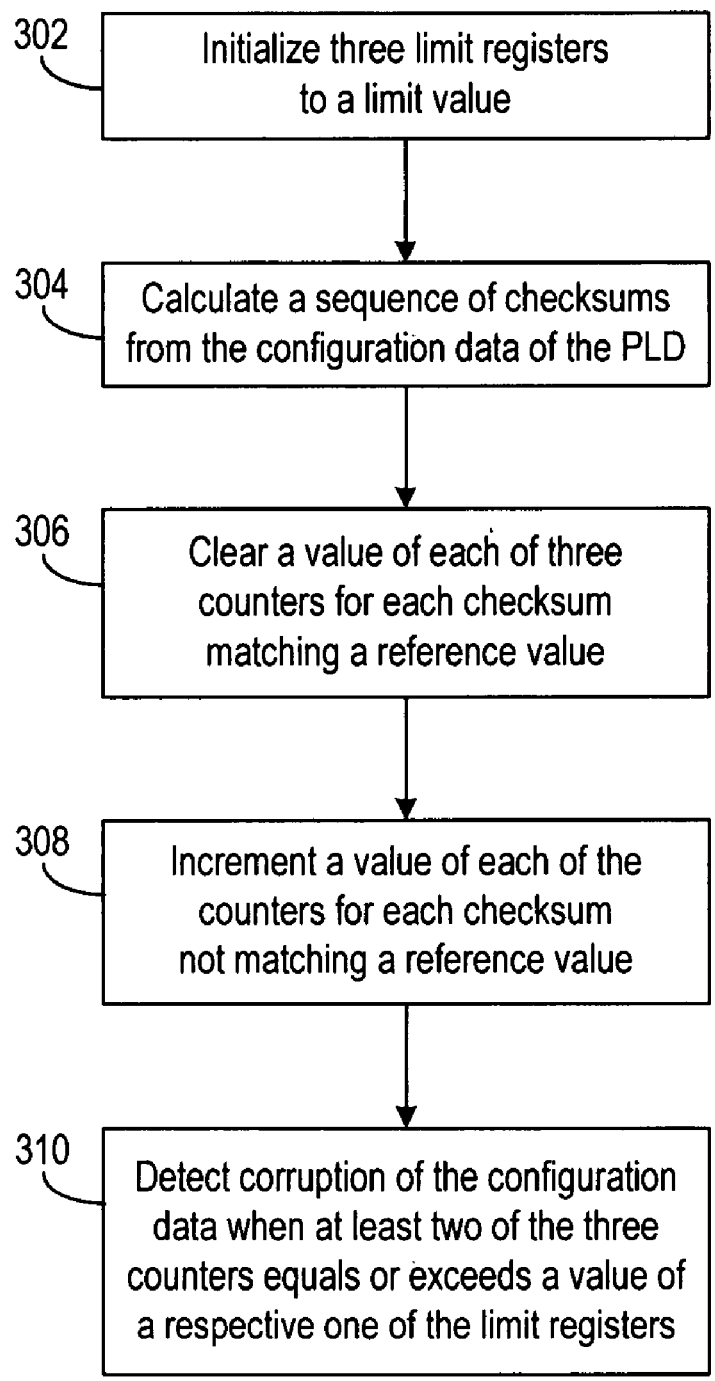
FIG. 3 is a flow diagram of a process for detecting corruption of configuration data of a programmable logic device in accordance with various embodiments of the invention.

FIG. 3 is a flow diagram of a process for detecting corruption of configuration data in a programmable logic device (PLD) in accordance with various embodiments of the invention. Redundant logic may robustly detect the persistent corruption of configuration data stored in a configuration memory of the PLD.

At step 302, three limit registers are each initialized to a limit value that is usually the same value for all of the limit registers. At step 304, a sequence of checksums is calculated for the configuration data in a configuration memory of the PLD. At step 306, each of three counters is cleared for each checksum in the sequence that matches a reference value. At step 308, each of the three counters is incremented for each checksum in the sequence that does not match the reference value.

At step 310, corruption of the configuration data is detected when two or all of the three counters equals or exceeds a value of the corresponding limit register for the counter. A voter may detect the corruption of the configuration data at step 310.

Figure 4:
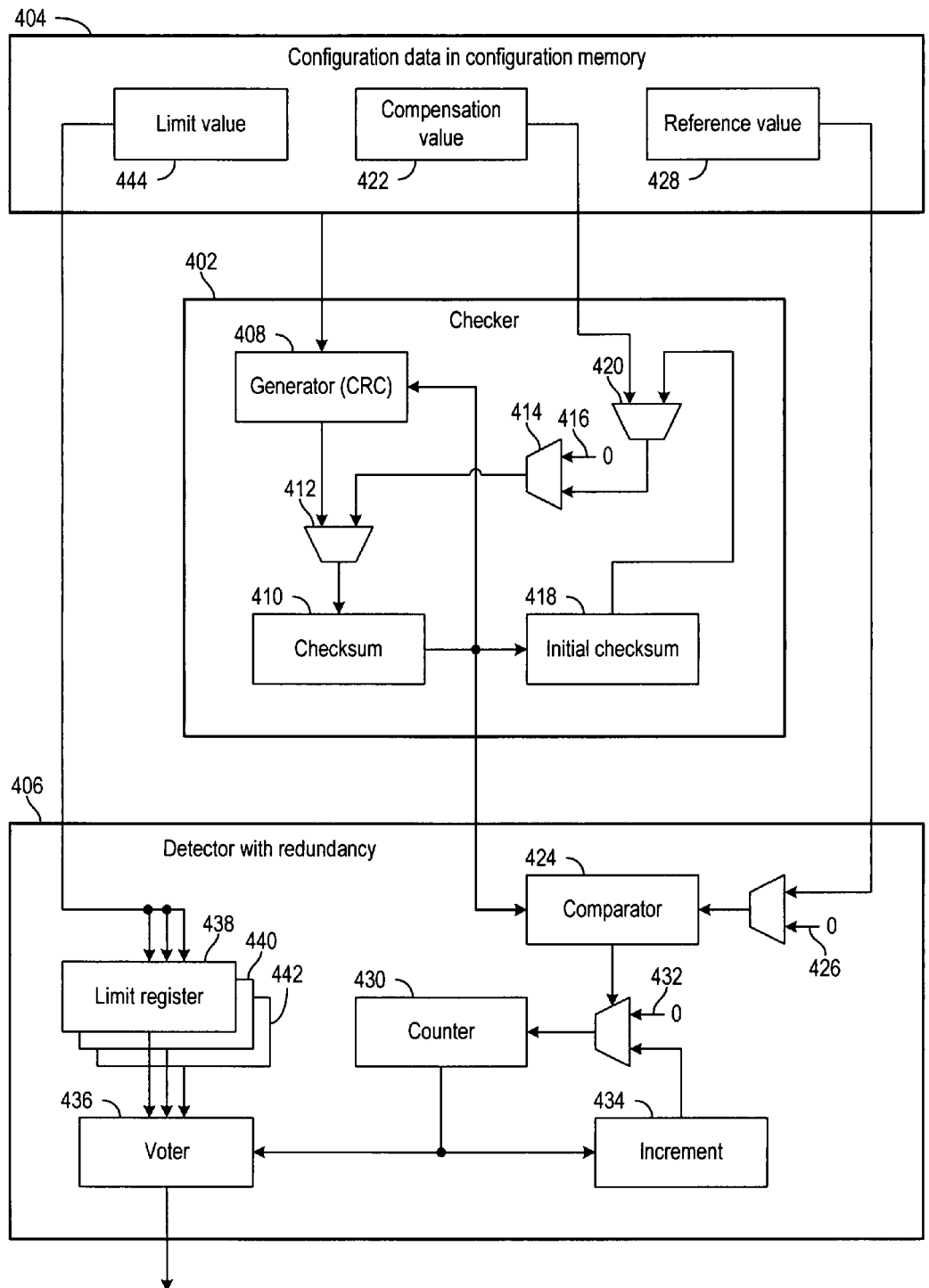
FIG. 4 is a block diagram of a system for detecting corruption of configuration data of a programmable logic device in accordance with various embodiments of the invention.

FIG. 4 is a block diagram of a system for detecting corruption of configuration data of a programmable logic device (PLD) in accordance with various embodiments of the invention. A checker 402 may repeatedly check for corruption of configuration data 404 stored in a configuration memory of the PLD. A detector 406 may check for a persistent indication of corruption from checker 402.

The checker 402 may read configuration data 404 from a configuration memory of the PLD. A generator 408 may receive frames or other blocks of the configuration data 404 and calculate a value for checksum 410 that is a cyclic redundancy code of the configuration data 404 for example. For each block of configuration data 404, generator 408 may calculate an updated value for checksum 410 from the block of configuration data and the preceding value for checksum 410. During the calculation of a cyclic redundancy code for the configuration data 404, multiplexer 412 may transfer the updated value of the cyclic redundancy code from the generator 408 to checksum 410. Prior to beginning a calculation of the cyclic redundancy code of the configuration data 404, multiplexer 412 may select an initialization value for checksum 410 from multiplexer 414.

In one embodiment, multiplexer 414 may select a value of zero on line 416 before calculating a cyclic redundancy code of the configuration data 404. After all of the configuration data 404 is read from the configuration memory, the value of checksum 410 should be a specific value if the configuration data 404 is not corrupted.

In another embodiment, multiplexer 412 selects certain values from multiplexer 414 before calculating a cyclic redundancy code of the configuration data 404. During reset of the PLD, the checker 402 is active and multiplexer 414 is controlled to initialize the checksum 410 with the value of zero on line 416. During reset, the final value of the checksum 410 of the configuration data 404 is used to update initial checksum 418. Following reset of the PLD, multiplexer 412 selects the initial checksum 418 via multiplexers 414 and 420 before calculating a cyclic redundancy code of the configuration data 404. Absent corruption of the configuration data 404, the final value of checksum 410 after reset may be a fixed value, such as zero, because the checksum 410 is initialized from the initial checksum 418.

For example, the generator 408 may be a parallel XOR of a word from checksum 410 and a word of the configuration data 404. During reset, the value of the checksum 410 may be initialized to the zero value on line 416. The final value calculated for checksum 410 during reset of the PLD may be stored in initial checksum 418. After reset, the value of the checksum 410 may be initialized from the initial checksum 418. The final value calculated for the checksum 410 after reset may be a value of zero while the configuration data 404 is not corrupted.

In yet another embodiment, the value of the checksum 410 is initialized with a compensation value 422 via multiplexers 412, 414, and 420 before calculating each cyclic redundancy code of the configuration data 404. The compensation value 422 may be selected such that the expected final value of the checksum 410 of the configuration data 404 is a fixed value of zero.

The compensation value 422 may be provided by certain cells of configuration memory 404 that are not used to configure the programmable logic and interconnect resources of the PLD. Alternatively, a specific user design may have unused programmable logic or interconnect resources that are used to provide the compensation value 422. For example, certain CLBs of the PLD may be unused in a specific user design, and look-up tables in these CLBs may be configured to any value without affecting the implementation of the specific user design in the PLD. The values in the configuration memory 404 controlling these look-up tables may be selected such that the final value of the checksum 410 is a fixed value of zero while the configuration data 404 is not corrupted.

It will be appreciated that certain embodiments may eliminate multiplexers 414 and/or 420 because, for example, the embodiments do not utilize a compensation value 422.

The comparator 424 of detector 406 may compare each cyclic redundancy code of the configuration data 404 to a fixed value of zero on line 426 or a reference value 428 depending upon the embodiment. If the checksum 410 is initialized with the zero value on line 416, then comparator 424 may compare the checksum 410 with the reference value 428. Otherwise, comparator 424 may compare the checksum 410 with the fixed reference value of zero on line 426.

For each cyclic redundancy code that is calculated, counter 430 may be set to either the zero value on line 432 if the checksum 410 has the expected value or an incremented value from increment block 434 if the checksum 410 does not have the expected value.

Voter 436 may compare the value of the counter 430 with each of three limit registers 438, 440, and 442. If the value of the counter 430 exceeds two or more of the limit registers 438, 440, and 442, then the voter 436 may indicate corruption of the configuration data 404. Each limit register 438, 440, or 442 may be initialized to a limit value 444. Limit value 444 is usually a value of two or more.

If the configuration data 404 is not corrupted by cosmic radiation, byproducts of radioactive decay, or noise sources, then the voter 436 should not indicate corruption of the configuration data 404. As long as the configuration data 404 is not corrupted, any compensation value 422, any reference value 428, and the limit value 444 should also be uncorrupted. Even though the configuration data 404 is not corrupted, the checker 402, the detector 406, or the reading of configuration data 404 from a configuration memory of the PLD may be affected by cosmic radiation, byproducts of radioactive decay, or noise sources.

When checker 402 or detector 406 is affected but the configuration data 404 is not affected, the corruption is transient unless storage state of checker 402 or detector 406 is corrupted. The storage state may include the checksum 410 and the initial checksum 418 of checker 402 and the counter 430 and the limit registers 438, 440, and 442 of detector 406.

For the checker 402, corruption of checksum 410 may cause one erroneous checksum of the configuration data 404. Consequently, corruption of checksum 410 generally does not cause detector 406 to indicate corruption of the configuration data 404 for a limit value 444 of at least two. Corruption of the initial checksum 418 may cause checker 402 to generate a series of erroneous checksums. However, triple redundancy and voting of initial checksum 418 may prevent the erroneous checksums. In addition, the initial checksum 418 may be omitted in embodiments that instead use the compensation value 422 or the reference value 428.

For the detector 406, corruption of the counter 430 may cause a false indication of corruption of the configuration data 404. Embodiments discussed in connection with FIGS. 5 and 6 include redundancy for counter 430. Voter 436 filters corruption of one of the limit registers 438, 440, or 442.

In addition, corruption that is transient and limited to a single node within the checker 402 or detector 406 usually does not cause voter 436 to indicate corruption of the configuration data 404. Voter 436 may include redundancy to prevent in indication of corruption of the configuration data 404 when a single node within the voter 436 is affected by cosmic radiation or other sources. However, voter 436 may have one output for indicating corruption of the configuration data 404, and a transient corruption may cause this output to indicate corruption of the configuration data 404. The likelihood that cosmic radiation affects this particular node may be acceptably low.

It will be appreciated that certain embodiments may implement the checker 402 and/or the detector 406 in an array of programmable interconnect and routing resources of a PLD.

Figure 5:
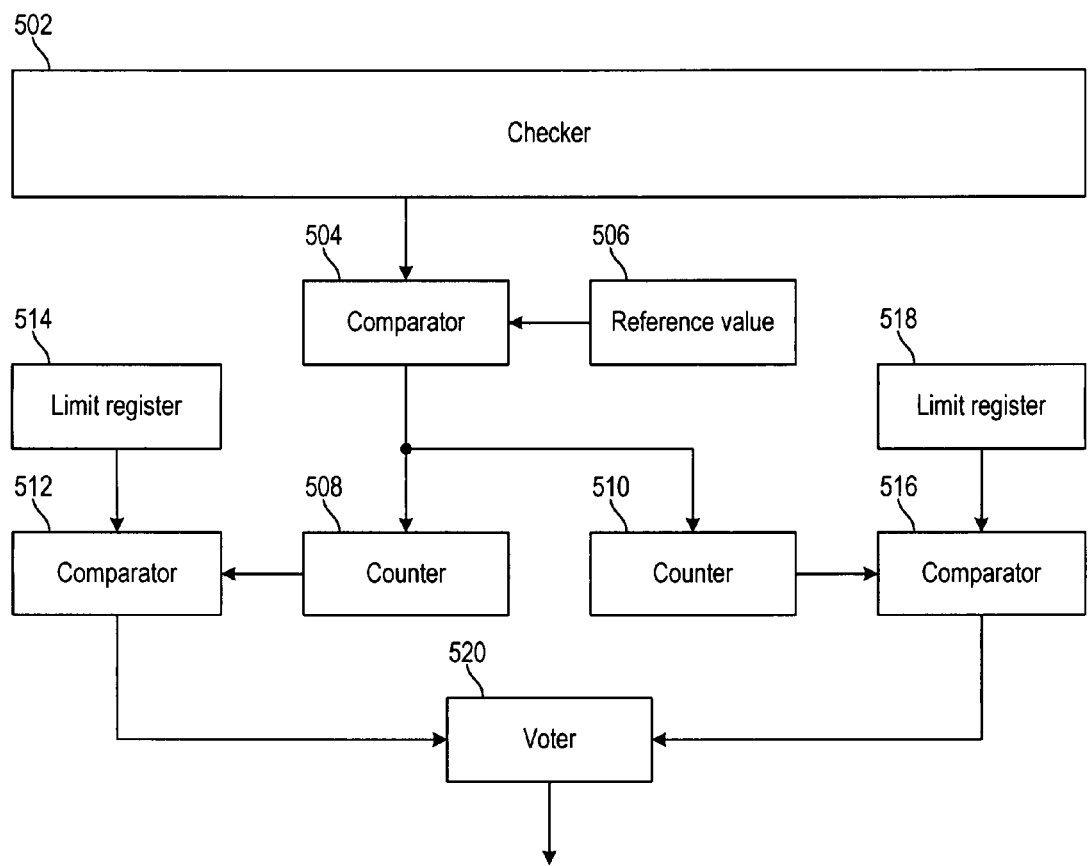
FIG. 5 is a block diagram illustrating a double-redundant detector of corruption of configuration data in accordance with various embodiments of the invention.

FIG. 5 is a block diagram illustrating a double-redundant detector of corruption of configuration data in accordance with various embodiments of the invention. A checker 502 continuously or periodically checks for corruption of configuration data. Even though the configuration data is not corrupted, corruption within checker 502 may cause the generation of an unexpected checksum of the configuration data. Corruption of the configuration data may be indicated when checker 502 persistently generates an unexpected checksum.

Comparator 504 may compare a checksum, such as a cyclic redundancy code, from checker 502 against a reference value 506. Counters 508 and 510 may increment when the checksum does not match the reference value 506 and may clear when the checksum does match the reference value 506.

Thus, counters 508 and 510 may usually count the number of consecutive times that the checksum from checker 502 does not match the reference value 506. However, cosmic radiation or other sources may corrupt the value of counters 508 or 510. The effects of cosmic radiation and other sources may be localized, such that counter 508 is not affected when counter 510 is affected, and vice versa.

Comparator 512 checks whether counter 508 exceeds the value of a limit register 514. Similarly, comparator 516 checks whether counter 510 exceeds the value of a limit register 518. Voter 520 indicates corruption of the configuration data when both comparators 512 and 516 indicate their respective limits are exceeded.

Reference value 506 may be included in the configuration data. Thus, reference value 506 is not corrupted unless the configuration data is corrupted.

The storage state may include counters 508 and 510 and limit registers 514 and 518. For corruption of a single node, one of counters 508 and 510 or one of limit registers 514 and 518 may be affected. A corrupted counter 508 or 510 is reset to zero when the comparator 504 receives the next checksum that matches reference value 506. Thus, a corrupted counter may cause one, but not both, of comparators 512 and 516 to indicate corruption of the configuration data. Similarly, a corruption of one of the limit registers 514 and 518 may cause one, but not both, of comparators 512 and 516 to indicate corruption of the configuration data. However, voter 520 does not indicate corruption of the configuration data unless both comparators indicate corruption of the configuration data.

Figure 6:
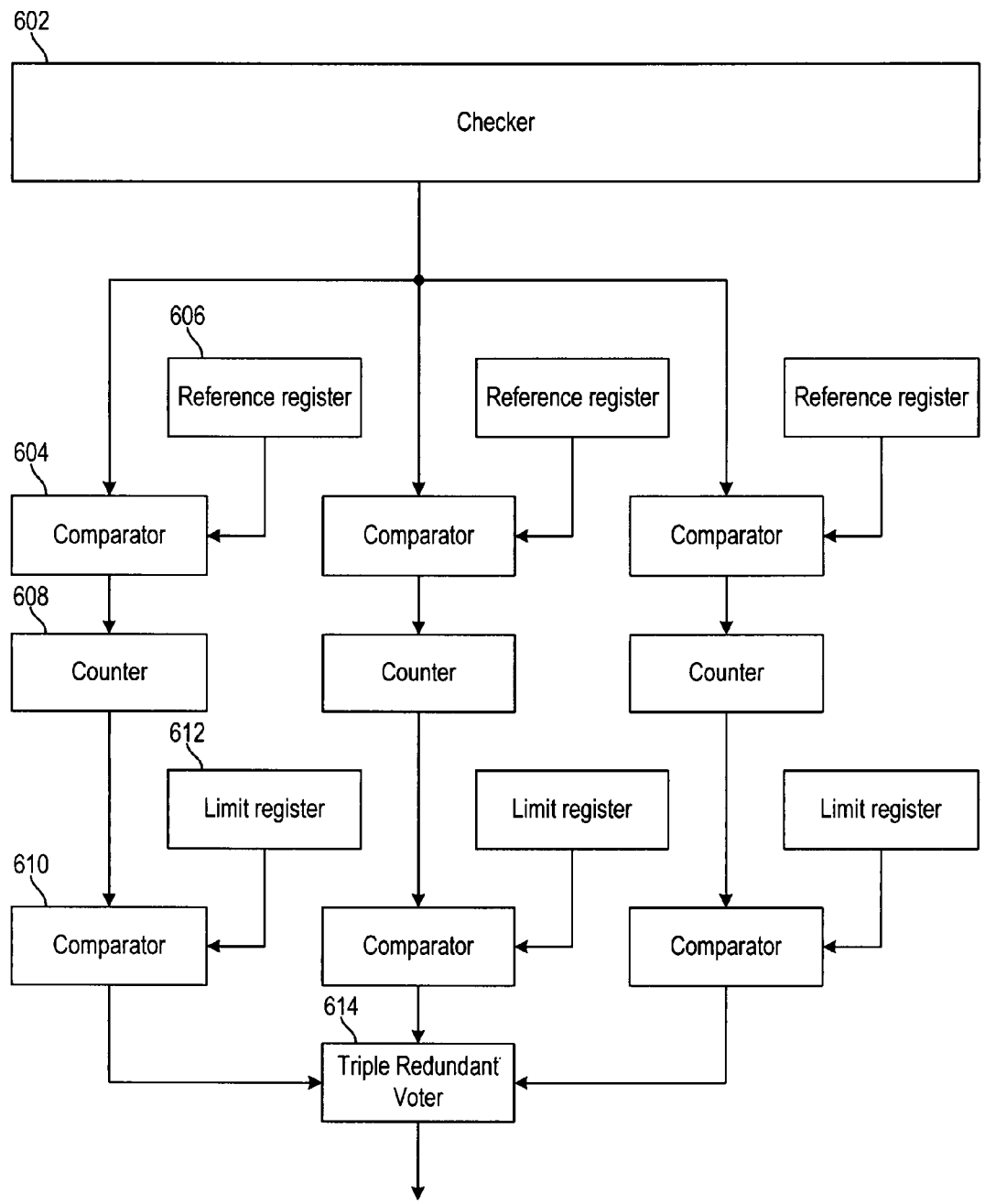
FIG. 6 is a block diagram illustrating a triple-redundant detector of corruption of configuration data in accordance with various embodiments of the invention.

FIG. 6 is a block diagram illustrating a triple-redundant detector of corruption of configuration data in accordance with various embodiments of the invention. A checker 602 may repeatedly generate a cyclic redundancy check or other checksum of the configuration data in a programmable logic device. The detector may filter unexpected checksums while the configuration data is not corrupted.

Comparator 604 may check whether a checksum from the checker 602 matches the expected checksum from reference register 606. Counter 608 may count the number of consecutive times that the checksum has an unexpected value. Comparator 610 may compare the value of counter 608 against a limit from limit register 612. Comparator 610 may indicate corruption when the value of counter 608 exceeds the limit from limit register 612.

The other comparators, counters, and registers may operate in a parallel fashion. For a corruption of a single node that is not in the configuration data, one input to the triple-redundant voter 614 may have a corrupted value that differs from the other two inputs. Triple-redundant voter 614 ignores the input that does not match the other two inputs. The triple-redundant voter 614 may include triple redundancy to mask corruption within the triple-redundant voter 614. Thus, the triple-redundant voter 614 may indicate corruption when the corruption is persistent corruption of the configuration data.

The present invention is thought to be applicable to a variety of systems for detecting corruption of configuration data of a programmable logic device. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit, comprising:
a configuration memory coupled to an array of programmable logic and interconnect resources that is configurable to implement a selected one of a plurality of user designs, the configuration memory adapted to store configuration data that configures the array of programmable logic and interconnect resources to implement the specified user design;
a checker coupled to the configuration memory and adapted to calculate a sequence of checksums from the configuration data that is stored in the configuration memory; and
a redundant-logic detector coupled to the checker and adapted to indicate corruption of the configuration data stored in the configuration memory in response to at least two consecutive checksums in the sequence not matching a reference value;
wherein the redundant-logic detector includes at least two counters and a voter, each counter adapted to count a number of consecutive checksums in the sequence that do not match the reference value, the voter coupled to the two counters and adapted to indicate the corruption of the configuration data stored in the configuration memory in response to at least one of the two counters having a value that is not less than a limit value.

2. The circuit of claim 1, wherein the circuit includes the array of programmable logic and interconnect resources that is configurable to implement the selected one of the plurality of user designs and the redundant-logic detector.

3. The circuit of claim 1, wherein the reference value is a fixed value.

4. The circuit of claim 1, wherein the checker is further adapted to continuously calculate the sequence of checksums from the configuration data that is stored in the configuration memory.

5. The circuit of claim 1, wherein the checker is further adapted to calculate each checksum in the sequence as a cyclic redundancy code of the configuration data.

6. The circuit of claim 1, wherein the checker is further adapted to calculate each checksum in the sequence with the checksum having a single fixed value while the checksum is not corrupted and the configuration data is not corrupted for the specified user design that is any one of the user designs.

7. The circuit of claim 6, wherein the checker is further adapted, in response to a reset of the circuit, to calculate an initial checksum of the configuration data, and following the reset of the circuit the checker is further adapted to calculate the sequence of checksums from the initial checksum and the configuration data, with each checksum in the sequence being the single fixed value while the checksum and the configuration data are not corrupted.

8. The circuit of claim 7, wherein the checker is further adapted to calculate each of the initial checksum and the checksums in the sequence from a starting value and the configuration data, with the starting value being a vector of zero-bits during the reset of the circuit and the starting value being the initial checksum following the reset of the circuit.

9. The circuit of claim 6, wherein the configuration memory is adapted to store the configuration data that includes a compensation value for making each checksum in the sequence be the single fixed value while the checksum and the configuration data are not corrupted.

10. The circuit of claim 1, wherein the voter is further adapted to indicate the corruption of the configuration data in response to the at least two counters both having a value that is not less than the limit value, and the voter is further adapted to not indicate corruption of the configuration data in response to the two counters not both having a value that is not less than the limit value.

11. The circuit of claim 1, wherein the doubly-redundant detector further includes, for each of the two counters, a respective limit register initialized to the limit value, and the voter is further adapted to indicate the corruption of the configuration data stored in the configuration memory in response to at least one of the two counters having a value that is not less than a value of the respective limit register.

12. The circuit of claim 1, wherein the redundant-logic detector is a triple-redundant detector.

13. The circuit of claim 12, wherein the triple-redundant detector is further adapted to not indicate the corruption of the configuration data stored in the configuration memory in response to a corruption limited to a corruption of a value of any one of all of a plurality of nodes in the triple-redundant detector.

14. The circuit of claim 12, further comprising:
wherein the at least two counters include three counters coupled to the checker and each adapted to be cleared in response to each checksum in the sequence that matches a reference value and to increment in response to each checksum in the sequence that does not match a reference value;
for each of the three counters, a respective limit register adapted to store a limit value; and
a voter coupled to the three counters and the respective limit registers, the voter adapted to indicate the corruption of the configuration data stored in the configuration memory in response to at least two of the three counters having a value that is not less than a value of the respective limit register.

15. The circuit of claim 14, wherein the voter is a triple-redundant voter.

16. The circuit of claim 14, wherein the triple-redundant detector further includes a respective reference register initialized to a reference value for each of the three counters, each of the three counters further adapted to be cleared in response to each checksum in the sequence that matches a value of the respective reference register and to increment in response to each checksum in the sequence that does not match a value of the respective reference register.

17. A method for detecting corruption of configuration data of a circuit, the method comprising:
for each of three sets of redundant logic, initializing a respective limit register of the set to a limit value;
serially calculating a sequence of checksums of the configuration data that is stored in configuration memory of the circuit;
for each of the three sets of redundant logic, clearing a value of a respective counter of the set for each checksum in the sequence that matches a reference value;
for each of the three sets of redundant logic, incrementing a value of the respective counter of the set for each checksum in the sequence that does not match a value of a reference value; and
detecting the corruption of the configuration data stored in the configuration memory of the circuit and outputting a signal indicative of the corruption in response to at least two of the three sets having a value of the respective counter that is not less than a value of the respective limit register.

18. The method of claim 17, wherein:
the initializing for each of the three sets of redundant logic further includes, for each of the three sets, initializing a respective reference register of the set to a reference value;
the clearing of a value of the respective counter for each of the three sets of redundant logic further includes, for each of the three sets, clearing a value of the respective counter of the set for each checksum in the sequence that matches a value of the respective reference register of the set of redundant logic; and
the incrementing of a value of the respective counter for each of the three sets of redundant logic further includes, for each of the three sets of redundant logic, incrementing a value of the respective counter of the set of redundant logic for each checksum in the sequence that does not match a value of the respective reference register of the set of redundant logic.

19. A system for detecting corruption of configuration data of a circuit, the method comprising:
means for initializing a respective limit register to a limit value for each of three sets of redundant logic;
means for serially calculating a sequence of checksums of the configuration data that is stored in configuration memory of the circuit;
means for clearing a value of a respective counter for each of the three sets of redundant logic for each checksum in the sequence that matches a reference value;
means for incrementing a value of the respective counter for each of the three sets of redundant logic for each checksum in the sequence that does not match a value of a reference value; and
means for detecting the corruption of the configuration data stored in the configuration memory of the circuit and for outputting a signal indicative of the corruption in response to at least two of the three sets of redundant logic having a value of the respective counter that is not less than a value of the respective limit register.

* * * * *